United States Patent
Iwatani

(10) Patent No.: US 7,106,028 B2
(45) Date of Patent: Sep. 12, 2006

(54) CONTROLLER OF A.C. GENERATOR FOR VEHICLES

(75) Inventor: Shiro Iwatani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/511,680

(22) PCT Filed: Nov. 26, 2002

(86) PCT No.: PCT/JP02/12325

§ 371 (c)(1),
(2), (4) Date: Oct. 18, 2004

(87) PCT Pub. No.: WO2004/049553

PCT Pub. Date: Jun. 10, 2004

(65) Prior Publication Data

US 2005/0231174 A1    Oct. 20, 2005

(51) Int. Cl.
*H02J 7/16* (2006.01)
*H02J 7/24* (2006.01)
*H02H 7/06* (2006.01)
*H02P 11/00* (2006.01)
*H02P 9/00* (2006.01)

(52) U.S. Cl. .......................... 322/28; 322/25

(58) Field of Classification Search ................ 322/25, 322/28
See application file for complete search history.

(56) References Cited

U.S. PATENT DOCUMENTS

| | | | | |
|---|---|---|---|---|
| 2,075,733 A | * | 3/1937 | Lazarus ........................ 338/20 |
| 3,984,755 A | * | 10/1976 | Lehnhoff et al. .............. 322/28 |
| 4,275,344 A | * | 6/1981 | Mori et al. .................... 322/28 |
| 4,386,310 A | * | 5/1983 | Sievers ......................... 322/28 |
| 4,590,414 A | * | 5/1986 | Mayumi et al. ............. 320/123 |
| 4,602,205 A | * | 7/1986 | Matsuhashi et al. ........ 320/166 |
| 4,616,162 A | * | 10/1986 | Radomski .................... 388/822 |
| 4,634,954 A | * | 1/1987 | Kato et al. .................... 322/28 |
| 4,680,529 A | * | 7/1987 | Komurasaki et al. ........ 322/28 |
| 4,760,323 A | * | 7/1988 | Naoi ............................ 322/33 |
| 5,061,889 A | * | 10/1991 | Iwatani et al. ............... 322/28 |
| 5,144,220 A | * | 9/1992 | Iwatani et al. ............... 322/28 |
| 5,157,321 A | * | 10/1992 | Kato et al. .................... 322/28 |
| 5,319,299 A | * | 6/1994 | Maehara ....................... 322/28 |
| 5,497,071 A | * | 3/1996 | Iwatani et al. ............... 322/28 |
| 5,982,155 A | * | 11/1999 | Rechdan et al. .............. 322/36 |
| 6,060,866 A | | 5/2000 | Sada et al. .................... 322/59 |
| 6,081,084 A | | 6/2000 | Crecelius .................... 318/254 |
| 6,614,207 B1 | * | 9/2003 | Maehara et al. .............. 322/28 |
| 2001/0005167 A1 | | 6/2001 | Nakamura et al. | |
| 2002/0027425 A1 | | 3/2002 | Yoshihito .................... 322/28 |

FOREIGN PATENT DOCUMENTS

EP    0 524 466 A2    1/1993
JP    62-104500 A    5/1987

(Continued)

*Primary Examiner*—Darren Schuberg
*Assistant Examiner*—Pedro J. Cuevas
(74) *Attorney, Agent, or Firm*—Sughrue Mion, PLLC

(57) ABSTRACT

The structure of the present invention includes: a switching element inserted in series in a field coil of an A.C. generator for intermittently controlling a field current supplied to the field coil in accordance with an output voltage from the A.C. generator in order to control the output voltage from the A.C. generator to a predetermined value; and conduction rate control means for detecting a rotational speed of the A.C. generator to reduce a conduction rate of the switching element in accordance with an increase in rotational speed.

5 Claims, 4 Drawing Sheets

| | FOREIGN PATENT DOCUMENTS | | |
|---|---|---|---|
| JP | 06-038720 A | 5/1994 | |
| JP | 2002-84672 A | 3/2002 | |
| JP | 2002-204600 | 7/2002 | |
| JP | 2002-204600 A | 7/2002 | |

\* cited by examiner

CONTROLLER OF A.C. GENERATOR FOR VEHICLES

TECHNICAL FIELD

The present invention relates to a controller of an A.C. generator for vehicles.

BACKGROUND ART

A conventional controller of an A.C. generator for vehicles controlled a duty ratio of a switching element for intermittently controlling a field current of a generator to thereby limit the field current so as for the field current not to exceed a predetermined limitation value. Note that, the predetermined limitation value is selected so as to become a value equal to or larger than a value of a field current which is to be caused to flow in order to obtain a predetermined output from the generator when a temperature of a generator has risen up to a predetermined value (refer to JP 6-38720 B (page 2 and FIG. 1)).

In accordance with such a conventional controller for an A.C. generator for vehicles, there are shown generator output characteristics in which a power transistor is usually held in a conduction state as long as a generated voltage is lower than a predetermined value after a maximum vehicle electrical load has been put on a generator, and hence an output is also increased in accordance with an increase in rotational speed of the generator. That is to say, there was encountered a problem such that temperatures of an armature coil and a rectifier rose along with an increase in output of the generator to become difficult to be suppressed within an allowable temperature, which resulted in reduction of quality. In addition, there was encountered a problem that a large cooling fan was required as means for enhancing a cooling property in order to suppress rise of a temperature, which resulted in that a generator could not be miniaturized.

DISCLOSURE OF THE INVENTION

The present invention has been made to solve the above-mentioned problems, and it is an object of the present invention that after the rotational speed of the generator exceeds the predetermined value, an increase in output of the generator is suppressed, whereby it is possible to realize the miniaturized controller of an A.C. generator for vehicles (car, and the like) which is capable of preventing the heating of the armature coil, the rectifier and the like, and hence which requires no cooling fan.

A controller of an A.C. generator for vehicles according to the present invention includes: a switching element inserted in series in a field coil of an A.C. generator for intermittently controlling a field current supplied to the field coil in accordance with an output voltage from the A.C. generator in order to control the output voltage from the A.C. generator to a predetermined value; and conduction rate control means for detecting a rotational speed of the A.C. generator to reduce a conduction rate of the switching element in accordance with an increase in rotational speed.

BEST MODE FOR CARRYING OUT THE INVENTION

Hereinafter, preferable embodiment modes of the present invention will be described with reference to the drawings.

Embodiment 1

Figure 1:
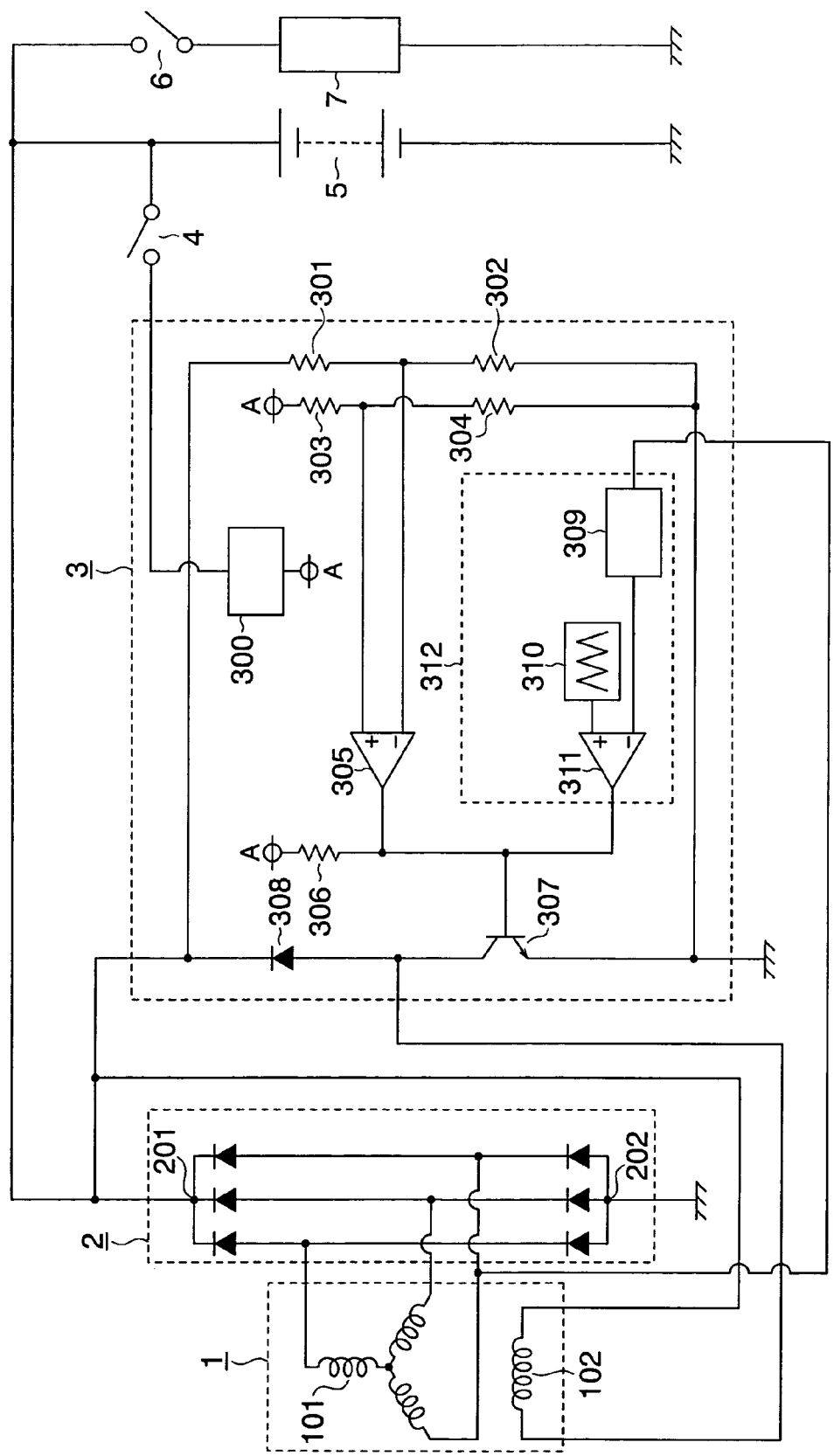
FIG. 1 is a circuit diagram of a controller of an A.C. generator for vehicles according to Embodiment 1 of the present invention.

FIG. 1 is a circuit diagram of a controller of an A.C. generator for vehicles according to Embodiment 1 of the present invention. In FIG. 1, a generator for vehicles (hereinafter referred to as "a generator" for short when applicable) 1 which is to be driven by an engine (not shown) has an armature coil 101 and a field coil 102. A rectifier 2 for subjecting an A.C. output of the generator 1 to full wave rectification has a main output terminal 201 and a grounding terminal 202. In addition, a voltage regulator 3 for regulating an output voltage of the generator 1 to a predetermined value includes voltage division resistors 301 and 302 for detecting a voltage which serve to voltage-dividing an output voltage obtained through the main output terminal 201 of the rectifier 2 to detect a resultant voltage.

A constant voltage power supply circuit 300 provides a constant voltage source A on the basis of an electric power which is supplied from a battery 5 by turning ON a key switch 4. A constant voltage of the constant voltage source A is divided through voltage division resistors 303 and 304 for generating a reference voltage to generate a reference voltage. In addition, a comparator 305 compares the detected voltage obtained through the voltage division in the voltage division resistors 301 and 302 for detecting a voltage with the reference voltage generated through the voltage division resistors 303 and 304 for generating a reference voltage. A power transistor (switching element) 307 is inserted in series in the field coil 102. As a current is supplied from the constant voltage source A to the power transistor 307 through a resistor 306, it causes the power transistor 307 to conduct, so a field current is supplied to the field coil 102 in accordance with an output of the comparator 305. An output voltage which has been outputted through the main output terminal 201 by turning ON a load switch 6 is supplied to a vehicle electric load 7.

Moreover, the controller for an A.C. generator for vehicles according to Embodiment 1 includes a conduction rate control circuit (conduction rate control means) 312 for controlling a conduction rate of the power transistor 307. The conduction rate control circuit 302 has an f-V converter 309 for converting a frequency proportional to a rotational speed obtained on the basis of one-phase output from the armature coil 101 into a voltage, a triangular waveform generator 310 for generating a voltage having a triangular waveform, and a comparator 311 for comparing the f-V conversion voltage value obtained through the f-V conversion in the f-V converter 309 with the voltage having a triangular waveform generated from the triangular waveform generator.

Next, an operation of the controller for an A.C. generator for vehicles having the above-mentioned configuration will hereinafter be described. First of all, upon turn-ON of the key switch 4, an electric power is supplied to the constant voltage power supply circuit 300 to supply a base current from the constant voltage source A to the power transistor 307 through the resistor 306. As the power transistor 307 conducts, it causes the field current to flow through the field coil 102, so the engine (not shown) is started to drive the generator 1 to thereby start the power generation.

The comparator 305 outputs an output signal at a "High" level when the detection voltage of the generator 1 detected by the voltage division resistors 301 and 302 for detecting a voltage is lower in level than a predetermined value set using the resistors 303 and 304 for generating a reference voltage, and outputs an output signal at a "Low" level when the detection voltage is higher in level than the reference voltage.

Figure 2:
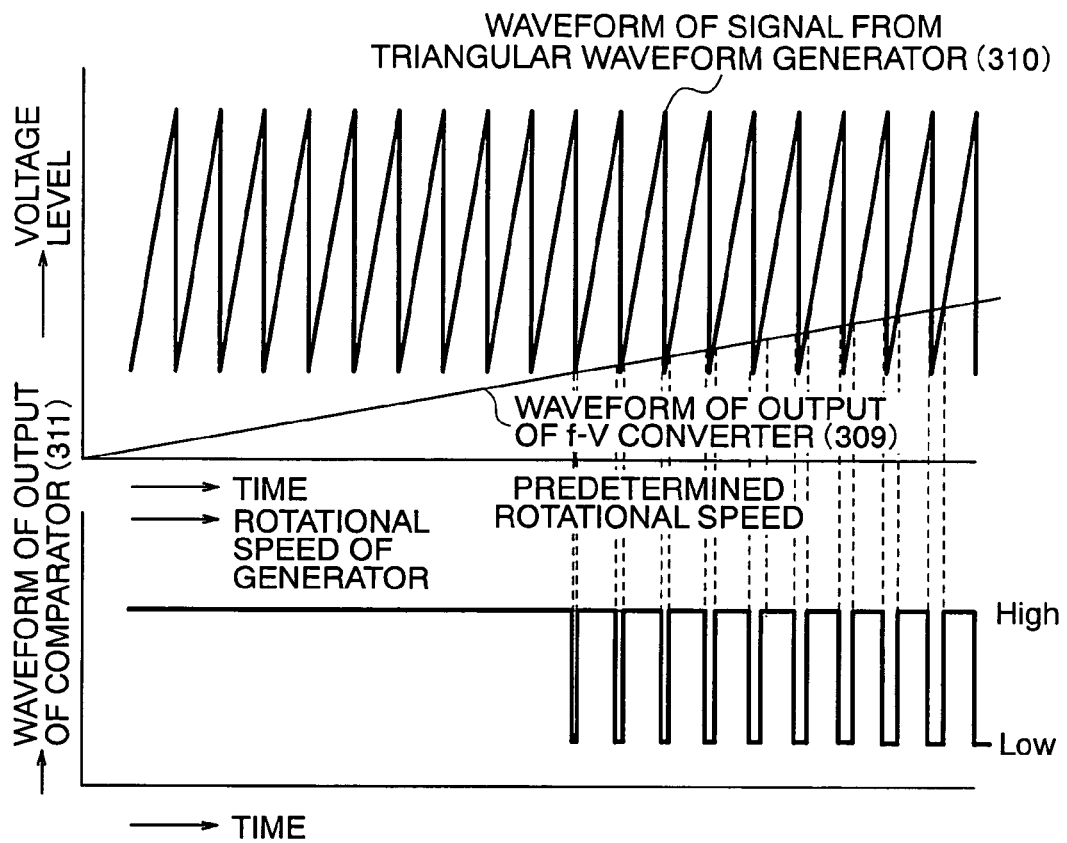
FIG. 2 is a waveform chart showing a relationship between a waveform of an input signal and a waveform of an output signal in a comparator of the controller of an A.C. generator for vehicles according to Embodiment 1 of the present invention.

In addition, the f-V converter 309 outputs the f-V conversion voltage value which is obtained by converting the frequency proportional to the rotational speed into voltage in response to the one-phase output signal from the armature coil 101. Here, an upper stage of FIG. 2 is a waveform chart showing a waveform of an input signal of the comparator 311, i.e., a waveform of an output signal of the triangular waveform generator 310 (an axis of abscissas represents an axis of time), and a waveform of an output signal of the f-V converter 309 (an axis of abscissas represents an axis of a rotational speed of the generator). Also, a lower stage of FIG. 2 is a waveform chart showing a waveform of an output signal of the comparator 311. As can be understood from FIG. 2, the comparator 311 compares the voltage level of the f-V conversion voltage value with the voltage level of the voltage having a triangular waveform generated by the triangular waveform generator 310. Then, the comparator 311 outputs an output signal at a "High" level when after the rotational speed of the generator 1 has exceeded a predetermined rotational speed, the voltage level of the f-V conversion voltage value does not exceed the voltage level of the voltage having a triangular waveform, and outputs an output signal at a "Low" level when after the rotational speed of the generator 1 has exceeded a predetermined rotational speed, the voltage level of the f-V conversion voltage value exceeds the voltage level of the voltage having a triangular waveform.

Figure 3:
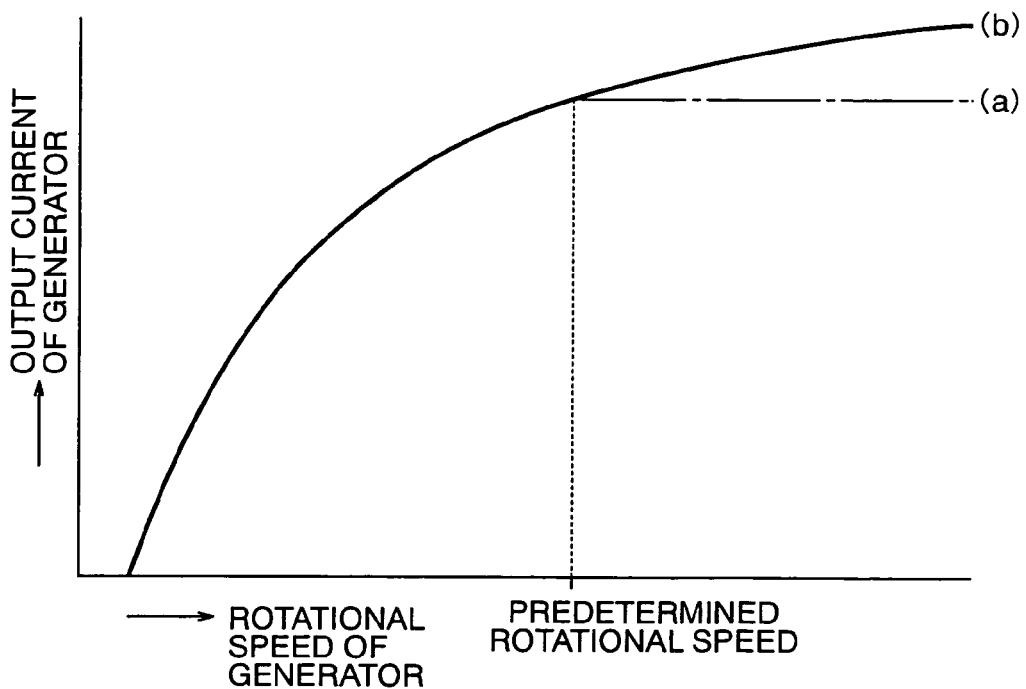
FIG. 3 is a graphical representation showing output current characteristics of the controller of an A.C. generator for vehicles according to Embodiment 1 of the present invention.

Consequently, a rate (Low rate) of a period of time when the output signal is at a Low level continues to be increased in accordance with an increase in rotational speed after the number of rotations of the generator 1 has exceeded a predetermined rotational speed. That is to say, a conduction rate of the power transistor 307 will continue to be decreased to reduce the field current. FIG. 3 is a graphical representation for comparison between output current characteristics of generators controlled by the controllers for an A.C. generator for vehicles. In the FIGURE, a curve (a) represents the output characteristics of the generator according to Embodiment 1 of the present invention, and a curve (b) represents the output characteristics of a conventional generator. From FIG. 3 as well, it is understood that the output current of the generator according to Embodiment 1 is suppressed so as not to be increased even when the number of rotations of the generator 1 exceeds the predetermined rotational speed.

As described above, according to the controller of an A.C. generator for vehicles of Embodiment 1 of the present invention, after the number of rotations of the generator 1 has exceeded the predetermined rotational speed, the conduction rate of the power transistor 307 is reduced in accordance with an increase in rotational speed to reduce the field current, whereby it is possible to obtain the output current characteristics in which even when the number of rotations of the generator 1 becomes equal to or larger than the predetermined rotational speed, the output current is suppressed so as not to be increased. Thus, the heating of the armature coil, the rectifier and the like can be prevented, and hence no cooling fan is required. Consequently, miniaturization can be realized.

Embodiment 2

Figure 4:
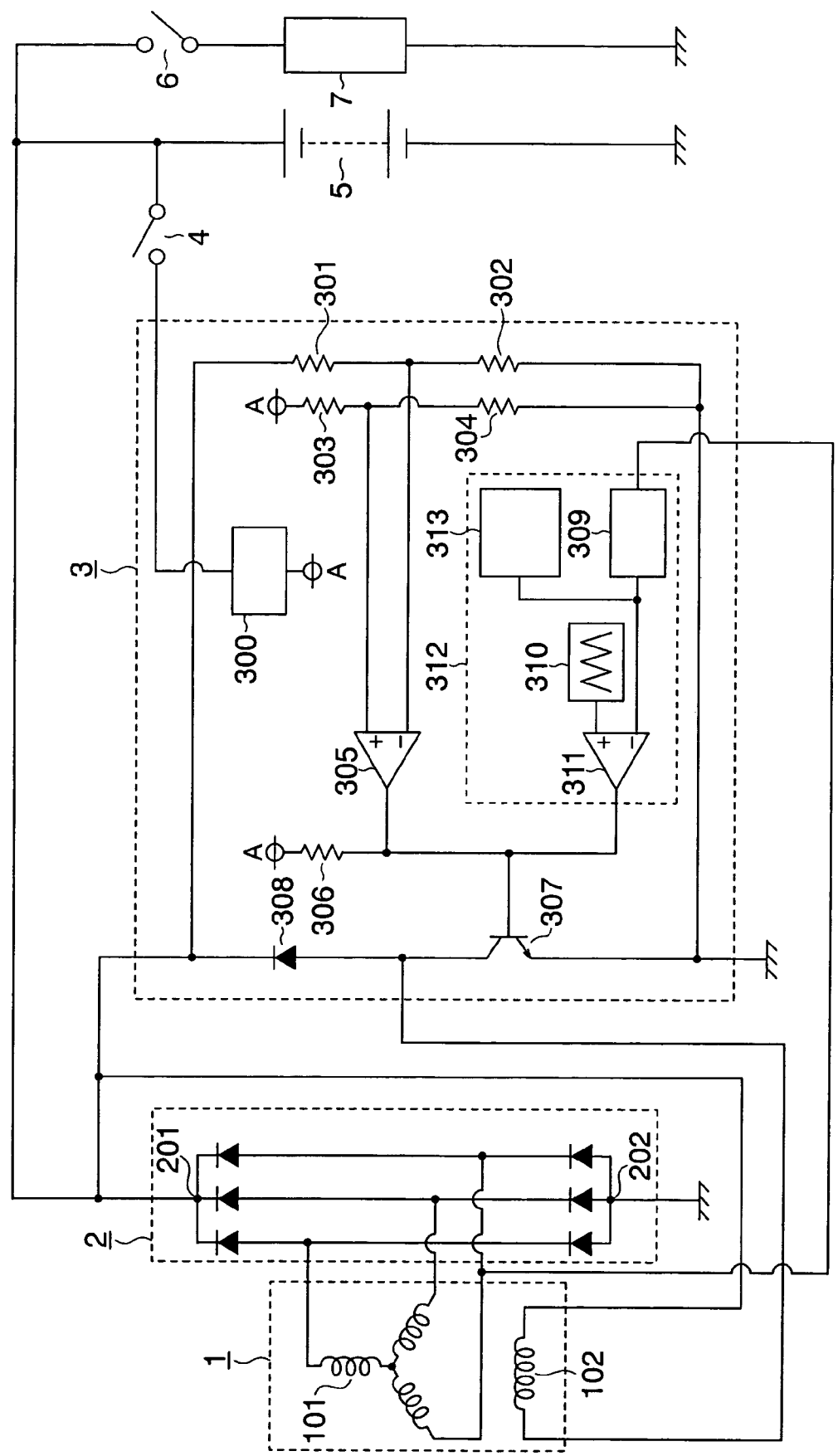
FIG. 4 is a circuit diagram of a controller of an A.C. generator for vehicles according to Embodiment 2 of the present invention.
Figure 7:
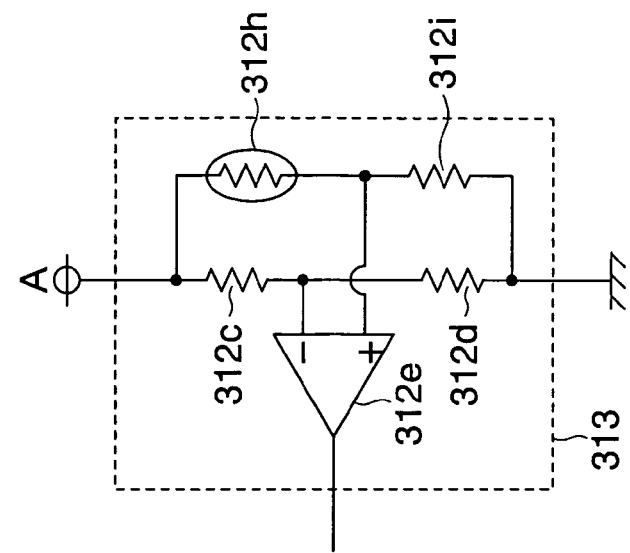
FIG. 7 is a circuit diagram of a concrete circuit configuration of a temperature detector shown in FIG. 4.
Figure 6:
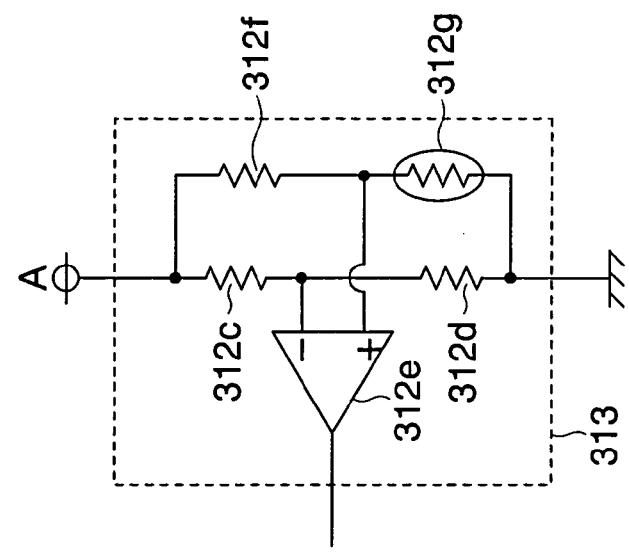
FIG. 6 is a circuit diagram of a concrete circuit configuration of a temperature detector shown in FIG. 4.
Figure 5:
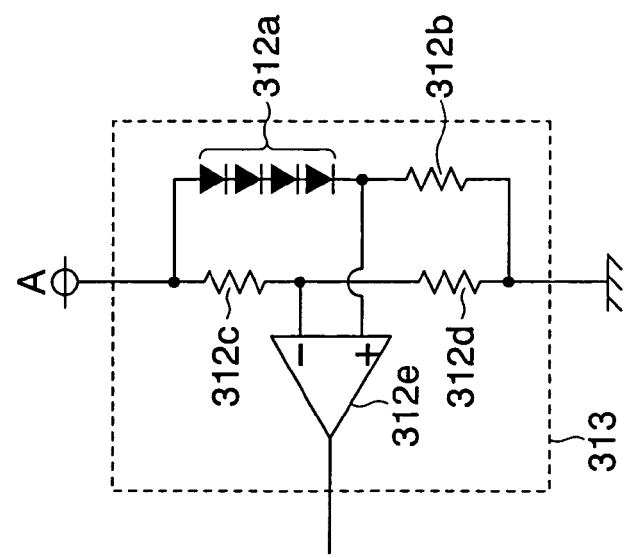
FIG. 5 is a circuit diagram of a concrete circuit configuration of a temperature detector shown in FIG. 4.

Next, FIG. 4 is a circuit diagram of a controller of an A.C. generator for vehicles according to Embodiment 2 of the present invention. The controller of Embodiment 2 has such a configuration as to newly provide a temperature detector 313 in the conduction rate control circuit 312 in addition to the constituent elements of the configuration shown in FIG. 1. FIGS. 5 to 7 show examples of concrete configurations of the above-mentioned temperature detector 313. FIG. 5 shows the temperature detector 313 including a thermosensitive semiconductor element, FIG. 6 shows the temperature detector 313 including a thermosensitive resistance element having a positive resistance temperature coefficient, and FIG. 7 shows the temperature detector 313 including a thermosensitive element having a negative resistance temperature coefficient.

The concrete configurations and operations of the temperature detectors 313 will hereinafter be described.

In FIG. 5, a diode 312a serving as the thermosensitive semiconductor element and a resistor 312b are inserted in series between the constant voltage source A and the earth to be adapted to detect a temperature change voltage obtained on the basis of a change in temperature of the diode 312a. In addition, voltage division resistors 312c and 312d, similarly, are inserted between the constant voltage source A and the earth to be adapted to generate a reference voltage from the constant voltage source A. The reference voltage and the temperature change voltage which are obtained in such a manner are compared with each other in a comparator 312e. Usually, the reference voltage (a minus input voltage of the comparator 312e) is set so as to be higher than the temperature change voltage (a plus input voltage of the comparator 312e), and hence the comparator 312e outputs an output signal at a "Low" level. At the time when a temperature detected by the temperature detector 313 has exceeded a predetermined temperature, the plus input voltage of the comparator 312e is increased in level due to negative temperature characteristics of an internal voltage drop developed across the diode 312a to exceed the reference voltage (the minus input voltage), which results in that the comparator 312e outputs an output signal at a "High" level.

In FIG. 6, a point of difference in configuration with FIG. 5 is that a resistor 312f and a posistor 312g serving as a thermosensitive resistance element having a positive resistance temperature coefficient are provided for detection of the temperature change voltage instead of the diode 312a serving as the thermosensitive semiconductor element and the resistor 312b. Note that, a resistor 312f is connected to the side of the constant voltage source A. Consequently, similarly to the case of FIG. 5, the comparator 312e normally outputs an output signal at a "Low" level. However, at the time when a temperature detected by the temperature detector 313 has exceeded the predetermined temperature, the plus input voltage of the comparator 312e is increased in level due to positive resistance temperature coefficient characteristics of the posistor 312g to exceed the reference voltage (minus input voltage), which results in that the comparator 312e outputs an output signal at a "High" level.

In FIG. 7, a point of difference in configuration with FIG. 6 is that a thermistor 312h having a negative resistance temperature coefficient and a resistor 312i are provided instead of the resistor 312f and the posistor 312g serving as the thermosensitive resistance element having a positive resistance temperature coefficient. Note that, conversely to the case of FIG. 6, the thermistor 312h is connected to the side of the constant voltage source A. Consequently, similarly to the cases of FIGS. 5 and 6, the comparator 312e normally outputs an output signal at a "Low" level. However, at the time when a temperature detected by the temperature detector 313 has exceeded the predetermined temperature, the plus input voltage of the comparator 312e is increased in level due to the negative resistance temperature coefficient characteristics of the thermistor 312h to exceed the reference voltage (minus input voltage) As a result, the comparator 312e outputs the output signal at a "High" level.

As described above, even if any of these temperature detectors 313 is used, when a temperature equal to or higher than the predetermined temperature is detected, the output signal at a "High" level is outputted, and when a temperature does not rise up to the predetermined temperature, the output signal at a "Low" level is outputted. Consequently, since whenever the output signal at a "Low" level is outputted from the temperature detector 313, the level of the output signal of the f-V converter 309 goes to "Low" to prohibit the output current of the generator 1 from being suppressed, the output current characteristics of the generator 1 at this time becomes identical to those of a conventional one. On the other hand, whenever the output signal at a "High" level is outputted from the temperature detector 313, the output signal of the f-V converter 309 becomes valid. Thus, if the number of rotations of the generator 1 exceeds the predetermined rotational speed, then the operation for suppressing an increase in output current of the generator 1 is carried out. Consequently, the temperature detector 313, only when a detected temperature is equal to or higher than the predetermined temperature, operates the f-V converter 309.

As described above, according to the controller of an A.C. generator for vehicles of Embodiment 2 of the present invention, the temperature detector 313 is provided to thereby allow a temperature limitation to be given.

INDUSTRIAL APPLICABILITY

According to the present invention, after the rotational speed of the generator exceeds the predetermined value, an increase in output of the generator is suppressed, whereby it is possible to realize the miniaturized controller of an A.C. generator for vehicles which is capable of preventing the heating of the armature coil, the rectifier and the like, and hence which requires no cooling fan.

The invention claimed is:

1. A controller of an A.C. generator for vehicles, comprising:
   a switching element inserted in series in a field coil of an A.C. generator for intermittently controlling a field current supplied to the field coil in accordance with an output voltage from the A.C. generator; and
   conduction rate control means for detecting a rotational speed of the A.C. generator to control a conduction rate of the switching element in accordance with an increase in rotational speed,
wherein the conduction rate control means comprises:
   an f-V converter that obtains a voltage through f-V conversion by converting a frequency proportional to the rotational speed of the A.C. generator into a voltage;
   a comparator for controlling the conduction rate of the switching element in accordance with a magnitude relationship between a level of the voltage obtained through the f-V conversion and a variable reference level.

2. A controller of an A.C. generator for vehicles according to claim 1, wherein the conduction rate control means further comprises temperature detection means for detecting a temperature of a predetermined position of the A.C. generator, and the temperature detection means, when a detected temperature is equal to or higher than a predetermined temperature, operates the f-V converter.

3. A controller of an A.C. generator for vehicles according to claim 2, wherein the temperature detection means comprises a thermosensitive semiconductor element.

4. A controller of an A.C. generator for vehicles according to claim 2, wherein the temperature detection means comprises a thermosensitive resistance element having a positive resistance temperature coefficient.

5. A controller of an A.C. generator for vehicles according to claim 2, wherein the temperature detection means comprises a thermosensitive resistance element having a negative resistance temperature coefficient.

* * * * *